United States Patent
Forster

(10) Patent No.: US 10,198,677 B2
(45) Date of Patent: Feb. 5, 2019

(54) RFID TAG FOR PRINTED FABRIC LABEL AND METHOD OF MAKING

(71) Applicant: Avery Dennison Retail Information Services, LLC, Westborough, MA (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 15/606,670

(22) Filed: May 26, 2017

(65) Prior Publication Data

US 2017/0344864 A1   Nov. 30, 2017

Related U.S. Application Data

(60) Provisional application No. 62/341,780, filed on May 26, 2016.

(51) Int. Cl.
| | |
|---|---|
| *G06K 19/02* | (2006.01) |
| *G06K 19/077* | (2006.01) |
| *B32B 15/00* | (2006.01) |
| *G06K 19/07* | (2006.01) |
| *B32B 5/26* | (2006.01) |
| *B32B 15/20* | (2006.01) |
| *B32B 3/08* | (2006.01) |
| *G09F 3/00* | (2006.01) |
| *B31D 1/02* | (2006.01) |
| *B23K 26/38* | (2014.01) |

(52) U.S. Cl.
CPC .............. *G06K 19/027* (2013.01); *B32B 3/08* (2013.01); *B32B 5/26* (2013.01); *B32B 15/00* (2013.01); *B32B 15/20* (2013.01); *G06K 19/025* (2013.01); *G06K 19/0723* (2013.01); *G06K 19/07775* (2013.01); *B23K 26/38* (2013.01); *B32B 2519/00* (2013.01)

(58) Field of Classification Search
CPC .............. G06K 19/027; G06K 19/025; G06K 19/0723; G06K 19/077725; G06K 19/07775; B23K 26/38; B23B 15/00
USPC ..................................................... 340/572.1
See application file for complete search history.

(56) References Cited

U.S. PATENT DOCUMENTS

| | | | | |
|---|---|---|---|---|
| 2007/0238245 A1* | 10/2007 | Cote | ................ | G06K 19/07718 438/243 |
| 2012/0061473 A1* | 3/2012 | Forster | ............ | G06K 19/07718 235/492 |
| 2014/0134607 A1* | 5/2014 | Lin | ...................... | G01N 27/327 435/5 |
| 2015/0072097 A1* | 3/2015 | Tobol | ..................... | B31D 1/027 428/41.8 |

(Continued)

*Primary Examiner* — Jack K Wang
(74) *Attorney, Agent, or Firm* — Avery Dennison Retail Information Services, LLC

(57) ABSTRACT

An RFID tag is disclosed that is formed as part of a printed fabric label (PFL). Generally, foil is adhered to a fabric material with a releasable adhesive, the foil is then cut, such as by a laser to define the antenna pattern and a removable portion. The removable portion is then manually stripped away, and a strap is then attached with adhesive to the antenna. A small square of hot melt over-laminate may be placed over the strap and bonded, and then a top layer of fabric is added and secured with an adhesive from a transfer tape.

15 Claims, 4 Drawing Sheets

(56) References Cited

U.S. PATENT DOCUMENTS

2015/0278671 A1\* 10/2015 Martin ................. G06K 19/027
 235/492
2016/0064814 A1\* 3/2016 Jang ....................... H01Q 1/526
 343/842

\* cited by examiner

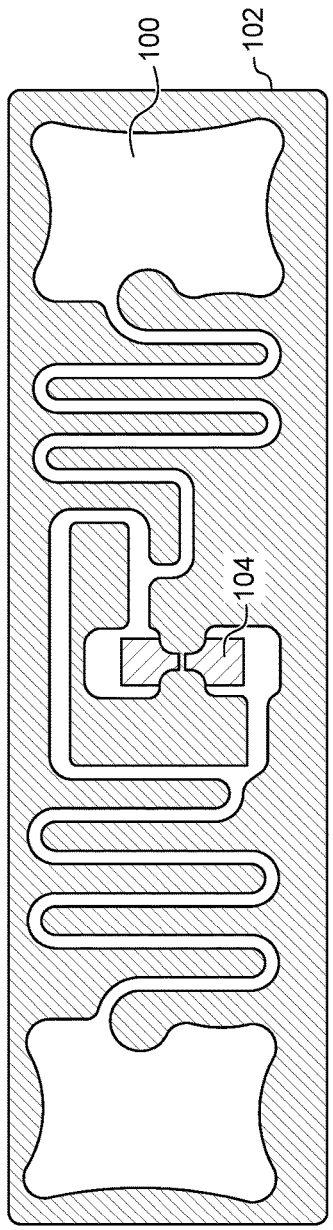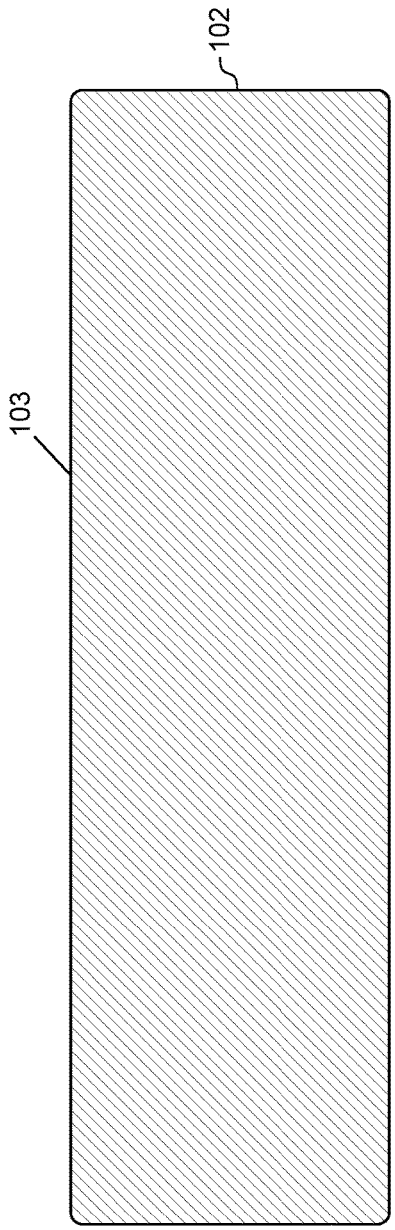
FIG. 2
FIG. 3

RFID TAG FOR PRINTED FABRIC LABEL AND METHOD OF MAKING

CROSS REFERENCE TO RELATED APPLICATION(S)

The present application claims priority to and the benefit of U.S. Provisional Patent Application No. 62/341,780 filed May 26, 2016, which is incorporated herein in its entirety.

BACKGROUND OF THE INVENTION

The present invention relates generally to forming a radio-frequency identification (RFID) tag which includes an antenna and chip or strap based chip on or within fabric or other material. Specifically, the antenna is provided for potential use with a printed fabric labels (PFL) which may be used for example as care labels for garments or apparel items.

Radio-frequency identification ("RFID") is the use of electromagnetic energy ("EM energy") to stimulate a responsive device (known as an RFID "tag" or transponder) to identify itself and in some cases, provide additionally stored data. RFID tags typically include a semiconductor device commonly called the "chip" on which are provided a memory and operating circuitry, which then is connected to an antenna. Chips can be mounted directly on an antenna or may be provided with straps in order to facilitate the connection to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal also provides the necessary energy to operate the RFID device. Active RFID tags can have their own power supply such as a battery and does not require the energy of activation as with passive tags.

RFID tags may be incorporated into or attached to articles to be tracked, such as apparel items, garments, accessories, consumer goods, packaging and the like. In some cases, the tag may be attached to the outside of an article with adhesive, tape, sewn in or attached to the item, welded, or other means and in other cases, the tag may be inserted within the article, such as being included in the packaging, located within the container of the article or inserted into a label or tag, such as between plies of a label or tag stock. The RFID tags are manufactured with a unique identification number which is typically a simple serial number of a few bytes with a check digit attached. This identification number is incorporated into the tag during manufacture. The user typically cannot alter this serial/identification number and manufacturers guarantee that each serial number is used only once. This configuration represents the low cost end of the technology in that the RFID tag is read-only and it responds to an interrogation signal only with its identification number. Typically, the tag continuously responds with its identification number. Data transmission to the tag is not possible. These tags are very low cost and are produced in enormous quantities.

Such read-only RFID tags typically are permanently attached to an article to be tracked and, once attached, the serial number of the tag is associated with its host article in a computer data base. Specifically, an object of the tag is to associate it with an article throughout the article's life in a particular facility, such as a manufacturing facility, a transport vehicle, a health care facility, a pharmacy storage area, or other environment, so that the article may be located, identified, and tracked, as it is moved. Tracking the articles through the facility can assist in generating more efficient dispensing and inventory control systems as well as improving work flow in a facility. This results in better inventory control and lowered costs. In the case of medical supplies and devices, it is desirable to develop accurate tracking, inventory control systems, and dispensing systems so that RFID tagged devices and articles may be located quickly should the need arise, and may be identified for other purposes, such as expiration dates or recalls.

Many RFID tags used today are passive in that they do not have a battery or other autonomous power supply and instead, must rely on the interrogating energy provided by an RFID reader to provide power to activate the tag. Passive RFID tags require an electromagnetic field of energy of a certain frequency range and certain minimum intensity in order to achieve activation of the tag and transmission of its stored data. Another choice is an active RFID tag; however, such tags require an accompanying battery to provide power to activate the tag, thus increasing the expense and potentially the size of the tag and making them undesirable for use in a large number of applications where cost is a principal consideration.

Depending on the requirements of the RFID tag application, such as the physical size of the articles to be identified, cost, their location, and the ability to reach them easily, tags may need to be read from a short distance or a long distance by an RFID reader. Furthermore, the read range (i.e., the range of the interrogation and/or response signals) of RFID tags is also limited. The present invention discloses an RFID tag that is formed as part of a printed fabric label (PFL). One benefit in the art to using a RFID tag incorporated into a PFL is that it minimizes the use of PET (polyethylene terephthalate) or other substrates which is desirable for recyclability and sustainability purposes.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an RFID tag that is formed as part of a printed fabric label (PFL). Generally, a conductive sheet or foil such as aluminum is laminated on a fabric material via a releasable adhesive, the foil may be cut via a cutter such as a laser or mechanical die cutter in order to define the pattern of the antenna, the conductive sheet which may be a foil is manually stripped away through use of the releasable adhesive, and a chip or a strap having a chip or integrated circuit mounted thereon is then attached with a thin layer of a conductive pressure sensitive adhesive. A small square of hot melt over-laminate may be placed over the strap and bonded, and then a top layer of fabric is added and secured via an adhesive that is applied with a transfer tape. Alternatively, the top layer of fabric may be applied directly over the strap and antenna without the additional laminate. In addition the top layer of the material may be secured by other suitable means such as ultrasonic welding, sewing or using a fastening system, e.g. mechanical or hook and loop type features.

In another embodiment, a half PFL can be utilized, such that the strap is bonded to the foil antenna but does not contain the hot melt over-laminate covering the strap or chip.

In a still further embodiment, an intermediate assembly for forming a printed fabric label with a RFID device, includes a printed fabric label substrate having first and second sides, a conductive foil applied to a substantial portion of the printed fabric label. A releaseable adhesive is applied between the conductive foil and the printed fabric label substrate and then a pattern is cut in the conductive foil to form an antenna pattern and a removable portion.

In a yet still further embodiment, a method of making a radio-frequency identification (RFID) tag structure for a PFL label is disclosed and includes the steps of initially providing a first material each having a top face and a bottom face, a RFID chip, and a conductive sheet of material. Then laminating the conductive sheet of material to the top face of the first sheet of material. Next, the conductive sheet is cut to form an antenna pattern and a removable portion. The removable portion of the conductive sheet is stripped away to define an antenna with at least one opening. A strap is attached across the at least one opening and the adhesive is cured bonding the strap to the conductive foil and the conductive material to the top face of the first sheet of material. An adhesive is applied via a transfer tape over the top of the antenna and a second material is bonded to the first material using the transfer tape adhesive.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 2 illustrates a top view of the RFID tag structure with the strap attached to the foil in accordance with the disclosed architecture.

FIG. 3 illustrates a top view of the RFID tag structure with a top layer of fabric added in accordance with the disclosed architecture.

DETAILED DESCRIPTION OF THE INVENTION

Figure 1A:
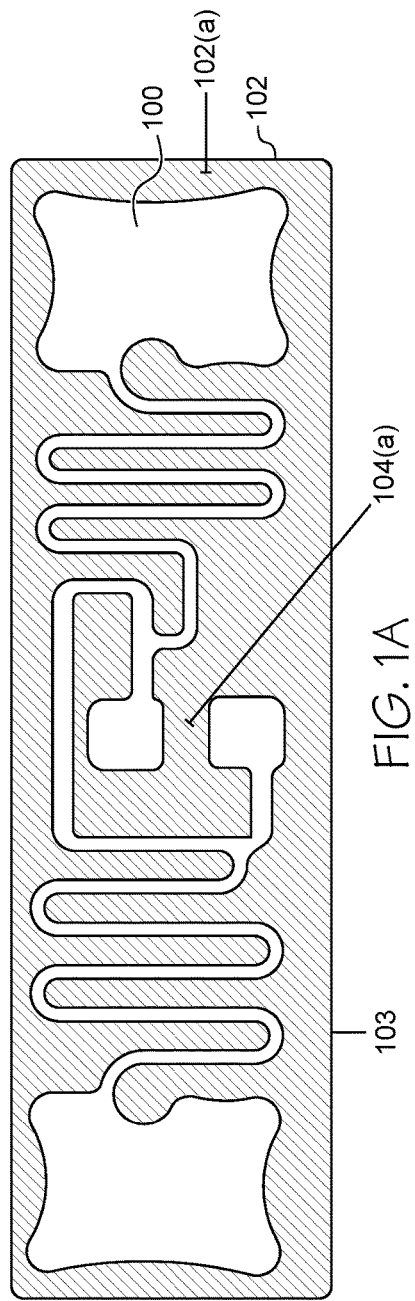
FIG. 1A illustrates a top view of the RFID tag structure with the foil removed in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses an RFID tag that is formed as part of a printed label such as a printed fabric label. The present invention contemplates that label may be constructed out of any sort of material known in the art such as a woven or a non-woven material, paper, card stock, polyethylene based material, and/or made from virgin or recycled material. Generally, a conductive layer such as foil is laminated to a first material substrate layer such as paper, woven fabric etc. via an adhesive layer, the foil is then cut and the matrix is stripped away manually or via a machine to define the antenna pattern, a strap or other microprocessor contact extensions such as interposers, or carriers may then be attached with an adhesive such as a thin layer of Devcon adhesive or a type of transfer tape. In one embodiment of the present invention, a component of hot melt over-laminate is placed over the strap and bonded, and then a top or second layer of fabric is added and secured with transfer tape. The hot melt over-laminate is in the shape of a square, but the present invention contemplates that any sort of geometrical shape may be used in order to bond the strap to the construction. In a further embodiment, no over laminate is required over the strap and chip area.

The present invention contemplates the utilization of a releasable, permanent, or semi-permanent type of adhesive as well. One embodiment presently contemplated utilizes a two stage adhesive. For instance, the adhesive used between the conductive layer and the first material substrate layer may be a hot melt, so that the conductive layer may be heated before or after a further cutting step. This allows for any unneeded portion of the conductive matrix to be stripped, and when cured, the adhesive can be considered permanent.

The foil may be cut by any means known in the art such as a rotary or mechanical die cut or a laser such as a laser. A rotary die cutter to cut an RFID antenna pattern is advantageous because rotary die cutting is both fast and inexpensive. However, rotary die cutters can have poor resolution, and are limited to having a minimum distance between cut lines of 1 mm.

Referring initially to the drawings, FIGS. 1-3 illustrate the RFID antenna structure 100 which is formed as part of a PFL 102 having a top 102(a) and bottom face 102(b) (see FIG. 4) such that the antenna structure 100 is attached to the top face of the PFL 102 and totally enclosed within the perimeter 103 of the PFL 102. Both faces of the PFL material are generally larger than the RFID antenna such that each face extends beyond the antenna along all axis and completely covers the area of the antenna when the material is placed around the antenna. That is the antenna 100 fits fully within the perimeter 103 of the PFL top and bottom sheets or plies 102(a) and 102(b).

Generally, the RFID antenna structure 100 is formed from a conductive material. The conductive material may be a foil made out of aluminum or any other suitable conductive material that is known in the art or may be printed using conductive ink (e.g. silver, copper, graphite, etc.). The conductive material is applied directly to the PFL substrate 102 and as can be seen from the drawings in FIGS. 1A and 1B, the shape is generally rectangular. However, depending on the structure of the antenna or PFL tag with which it is associated, the conductive material may be any shape. The RFID antenna structure 100 and PFL 102 can be any suitable size, shape, and configuration as is known in the art without affecting the overall concept of the invention.

Figure 1B:
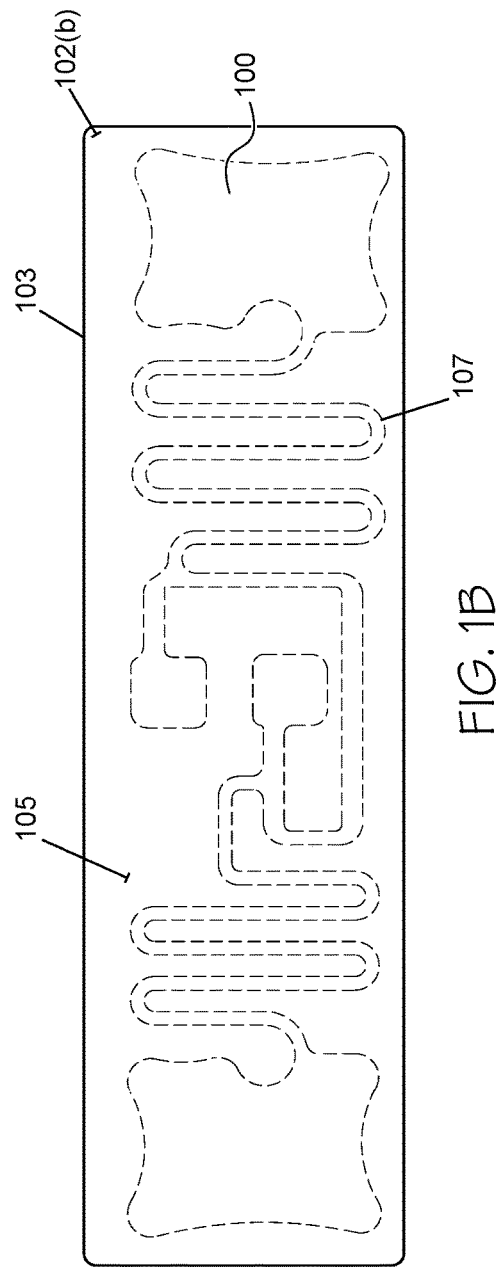
FIG. 1B shows a top view of the RFID tag structure with the foil sheet in position and an outline of the antenna.

Referring to FIG. 1B, the antenna pattern 107 to be formed in the conductive material is cut using a laser, mechanical die cutter or other suitable cutter. The general outline of the antenna is formed using the cutting devices. One or more passes may be required depending on the complexity of the antenna shape being formed and the type of cutter that is used. The surrounding matrix 105 is then peeled away from the antenna design 107 to reveal the finished antenna structure which is shown in FIG. 1A.

FIG. 1B provides for an intermediate assembly in which the conductive material is placed on the PFL material and has an outline of the antenna structure to be subsequently formed. This intermediate assembly can be created as part of an in line, reel to reel process and then the desired antenna pattern formed subsequently when needed and depending on the requirements of the end product.

The shape of the antenna is generally matched with the type of chip and/or article to which the RFID tag is to be attached. One of ordinary skill in the art will appreciate that the shape and size of the antenna structure 100 and PFL 102 as shown in FIGS. 1-3 is for illustrative purposes only and many other shapes and sizes of the antenna structure 100 and PFL 102 are well within the scope of the present disclosure. Although dimensions of the antenna structure 100 and PFL 102 (i.e., length, width, and height) are important design parameters for good performance, the antenna structure 100 and PFL 102 may be any shape or size that ensures optimal performance and sensitivity during use.

The RFID antenna structure 100 is configured via a single width cut, in one embodiment—by a laser or any other suitable laser or method as is known in the art, such as die cutting or etching, etc. A single pass of the single width laser burn is used to define the antenna structure 100, and particularly the chip or strap attachment area and multiple passes of the laser would cut or slit the fabric (PFL) 102 at the same time as the foil. A single pass may be sufficient for certain types of materials used in the construction whereas a plurality of passes with the cutting device may be required for other types of materials. The foil is then manually or machine stripped away to reveal the antenna design. After any additional conductive material is stripped away, the adhesive layer may be changed from a first state to a second state, for instance from a releasable state to a permanent state by heat.

An advantage of the present invention is that the area that is removed and stripped away to reveal the antenna design is defined by a cut or a plurality of cuts illustrating the flexibility of the present invention and the system's ability to switch from one function to the next without stopping to change printing plates as in the prior art. Additionally, after the removal of the foil, any exposed adhesive that may be present can be used to form additional label(s) from that originally set forth.

A further advantage of the invention is that RFID devices can be added to a web of care labels or other printed fabric labels without having to re-engineer the manufacturing process of the label itself. By being able to coat a fabric layer with adhesive, e.g. a releaseable or changeable adhesive, then applying a conductive material over the adhesive an intermediate substrate is prepared. With this intermediate substrate, an apparel manufacturer can cut the antenna pattern and then remove the matrix surrounding the antenna pattern and attach a chip or strap prior to applying or folding over a cover layer to conceal the RFID device. This process allows for quick adaptation of apparel labels with RFID.

In one embodiment, where a laser is utilized for cutting of the conductor layer, the conductive layer heats and locally cures the adhesive under the cut point edge, which secures an edge of the conductor layer to the edge during the matrix stripping operation.

Furthermore, in one embodiment, a strap 104 is disposed across the gap 104(a) (see FIG. 1A) of the antenna structure 100 and attached with a conductive pressure sensitive adhesive (or similar adhesive equivalent), and may be attached using a Devcon type adhesive. Transfer tape could also be used to apply the second layer to the first layer of the printed fabric label assembly. The transfer tape has an adhesive which when applied to the substrate, transfers to the substrate when the carrier layer is removed allowing the adhesive to be used to secure the second layer to form the printed fabric layer. The antenna structure 100 and PFL material 102 are then hot melted together which cures both the PFL material 102 to the antenna structure 100 and the antenna structure 100 to the substrate adhesive. The present invention contemplates that in one embodiment, a chip may be directly attached to the antenna without the utilization of a strap.

Figure 4:
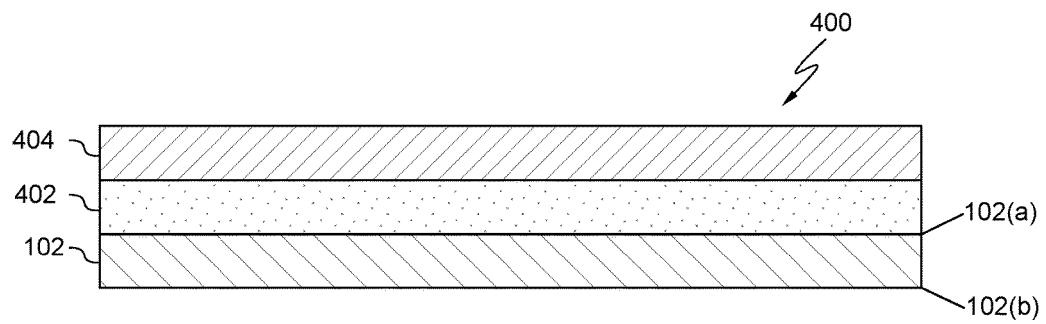
FIG. 4 illustrates a side view of the RFID tag structure in accordance with the disclosed architecture.

Specifically, the method is shown in FIGS. 4-8. As illustrated in FIG. 4, a side view of the layered construction of the laminate 400 is shown. The paper or PFL fabric material 102 is coated with a releasable, low strength, tack adhesive 402 or transfer tape, or any other suitable adhesive type material. Foil 404 is then laminated to the fabric 102 by being placed on top of the adhesive 402. The adhesive can be applied in a flood coat and then areas of the adhesive deadened to correspond to the areas of the antenna or alternatively the adhesive may be pattern coated or printed so as to mimic the areas where the antenna is to be formed. When the adhesive is layer is not defined by a pattern such as by flood coating, the present invention contemplates that any pattern can be utilized to create an antenna. Furthermore, an advantage of not patterning the adhesive is the cut shape does not need to be registered to a specific pattern allowing for more reliability at higher speeds and allows for a lower cost adhesive to be utilized. Another advantage to using a coating process for the adhesive layer is it allows for the use of an adhesive that is compatible with a direct chip attach process and/or an adhesive that is environmentally friendly, such as an adhesive having no organotins. In one embodiment, the adhesive is deadened via a UV source. In this way, the foil only adheres to the active or tacky areas of the adhesive so that when the foil is removed after cutting, the unneeded areas are easily stripped away.

In another embodiment, the adhesive layer may be preprinted as any sort of geometrical shape and a design for an antenna is inside the geometrical shape, reducing the amount of adhesive that is used and removing a need for registration between a printed pattern and a cutting system.

Figure 5:
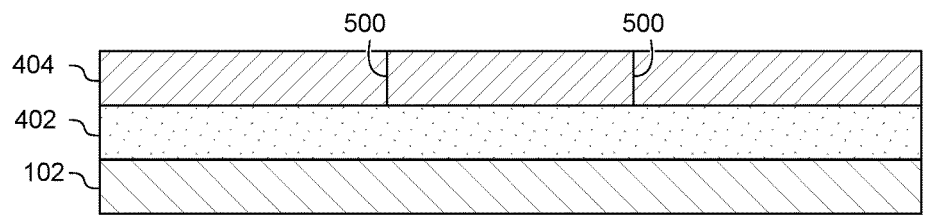
FIG. 5 illustrates a side view of the RFID tag structure with laser cuts in accordance with the disclosed architecture.
Figure 6:
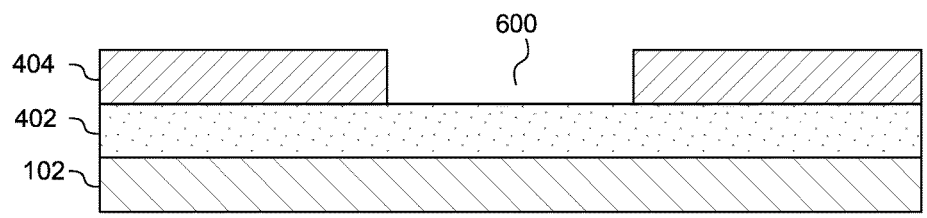
FIG. 6 illustrates a side view of the RFID tag structure with the foil removed in accordance with the disclosed architecture.

As illustrated in FIG. 5, cuts 500 such as by a laser are made in the foil 404 to define the antenna. Then, the foil 404 is manually stripped away to create a gap 600 as shown in FIG. 6.

Figure 7:
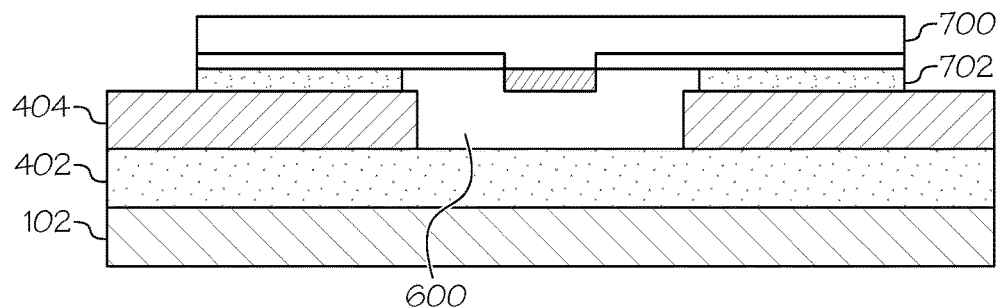
FIG. 7 illustrates a side view of the RFID tag structure with the strap attached in accordance with the disclosed architecture.
Figure 8:
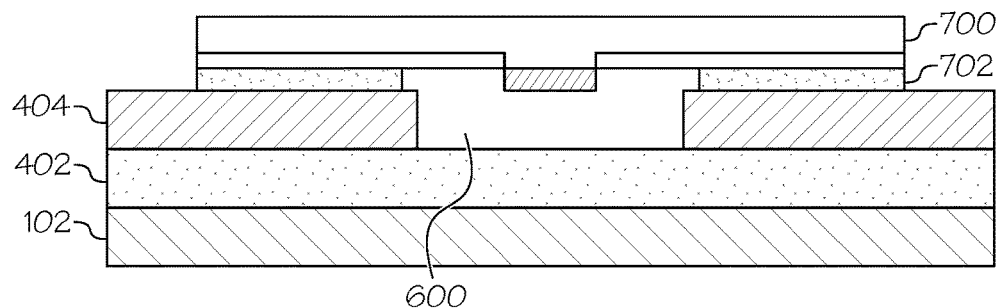
FIG. 8 illustrates a side view of the RFID tag structure with the strap cured to the laminate in accordance with the disclosed architecture.

As illustrated in FIG. 7, a strap 700 is attached across the gap 600 in the foil 404 and coupled to the adhesive 702. Then, the strap 700 is cured via a hot roll or laminate cure such that both the strap 700 to foil 404 is cured and the foil 404 to adhesive substrate 402 is cured as shown in FIG. 8. The present invention contemplates the utilization of a second layer/sheet of material—a top layer of fabric (PFL) can then be added over top of the structure such that the second layer of material has a top and a bottom face and the bottom face of the second layer of material is attached over the structure. The present invention contemplates that in one embodiment, the top face of the second layer of material can be printed on by any type of printer known in the art such an ink jet printer before or after it is adhered to the construction. The second layer of the material may contain human or machine readable indicia such as a barcode.

In another embodiment, a half PFL can be utilized, wherein the strap is bonded to the foil antenna but does not contain the hot melt over-laminate.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio-frequency identification (RFID) tag structure comprising:
    a first material substrate with a top and a bottom face;
    a conductive material adhered to the top face of the substrate, the conductive material is patterned to form an antenna and a removable portion, the conductive material is applied wholly within a perimeter of the first material substrate;
    a RFID chip attached to the antenna;
    a second material substrate that completely overlies the antenna and chip and is in substantial alignment with the first material substrate after removal of the removable portion; and
    the second material is adhered with an adhesive provided by a transfer tape.

2. The RFID tag structure of claim 1, wherein the first and second material substrate are fabric.

3. The RFID tag structure of claim 1, wherein a strap is used to attach the chip to the antenna.

4. The RFID tag structure of claim 1, wherein the conductive material is an aluminum foil.

5. A RFID tag structure formed from a PFL material, comprising:
    a fabric PFL layer;
    a laser-cut foil layer secured to the fabric PFL layer via a releasable adhesive coated over a surface of the fabric PFL layer, the laser cut foil layer having an antenna pattern and a removable portion;
    a strap applied over the foil layer in an area defining a gap and coupled to the foil layer via a conductive adhesive and the strap is coupled to the foil layer via an area of adhesive over the strap;
    a top layer of material positioned over the strap; and
    a second PFL layer positioned over the top layer of material and antenna, after removal of the removable portion to completely cover the laser cut foil layer.

6. The RFID tag structure of claim 3, wherein the strap is coupled to the antenna material-via placing a small amount of hot melt adhesive over the strap to laminate the strap to the antenna.

7. The RFID tag structure of claim 3, wherein the strap is coupled to the antenna without the hot melt over-laminate to create a half PFL.

8. A method of making a radio-frequency identification (RFID) tag structure for a PFL label comprising the steps:
    providing a first material each having a top face and a bottom face, a RFID chip, and a conductive sheet of material;
    laminating the conductive sheet of material to the top face of the first sheet of material;
    cutting the conductive sheet to form an antenna pattern and a removable portion;
    stripping away the removable portion of the conductive sheet to define an antenna with at least one opening;
    attaching a strap across the at least one opening;
    curing the adhesive bonding the strap to the conductive foil and the conductive material to the top face of the first sheet of material;
    applying an adhesive via a transfer tape over the top of the antenna;
    bonding a second material to the first material using the transfer tape adhesive.

9. The method of claim 8, further comprising providing a second sheet of material having a top and bottom face.

10. The method of claim 9, wherein the second sheet of material has a top and a bottom face such that the bottom face of the second sheet of material is adhered over the top of the RFID tag structure.

11. The method of claim 8, wherein a thin layer of Devcon adhesive is used to attached the strap.

12. The method of claim 8, wherein the cutting is done by a single width laser.

13. The method of claim 8, wherein stripping away is completed manually.

14. The method of claim 8, further comprising attaching a hot melt over-laminate over the strap after the strap is attached across the at least one opening.

15. An intermediate assembly for forming a printed fabric label with a RFID device, comprising,
    a printed fabric label substrate having first and second sides;
    a conductive foil applied to a substantial portion of the printed fabric label;
    a releaseable adhesive applied between the conductive foil and the printed fabric label substrate; and
    a pattern cut in the conductive foil by a single width cut to form an antenna pattern and a removable portion.

* * * * *